Figure 12:
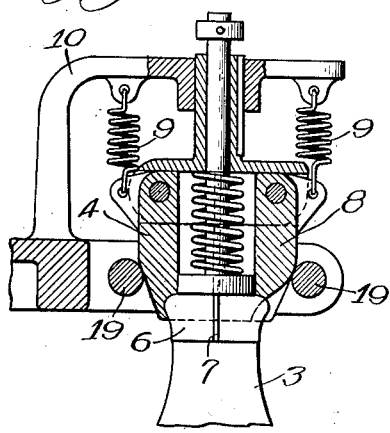

O. N. TEVANDER.
CLOSURE APPLYING MACHINE.
APPLICATION FILED JUNE 26, 1915.
1,219,791.
Patented Mar. 20, 1917.
7 SHEETS—SHEET 1.
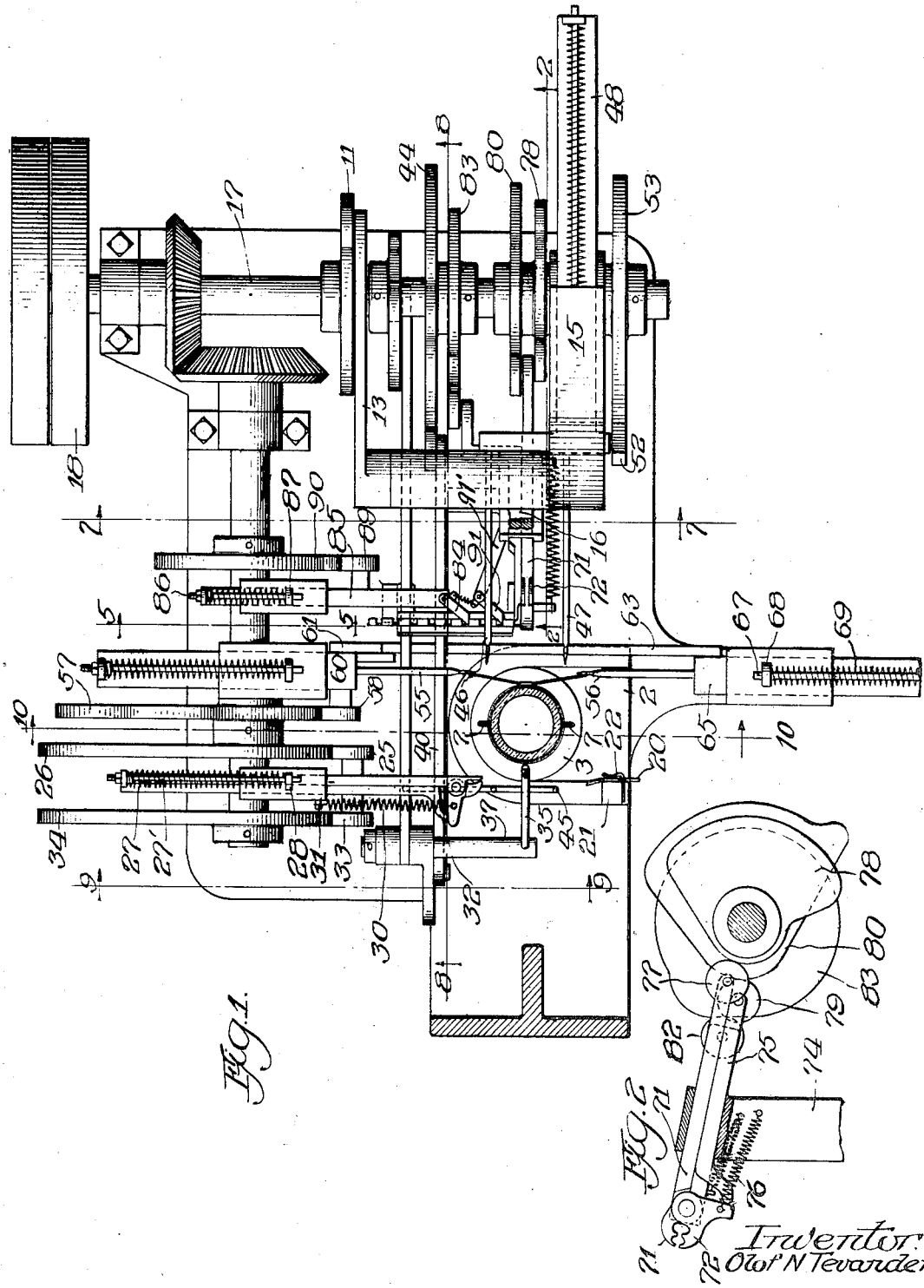

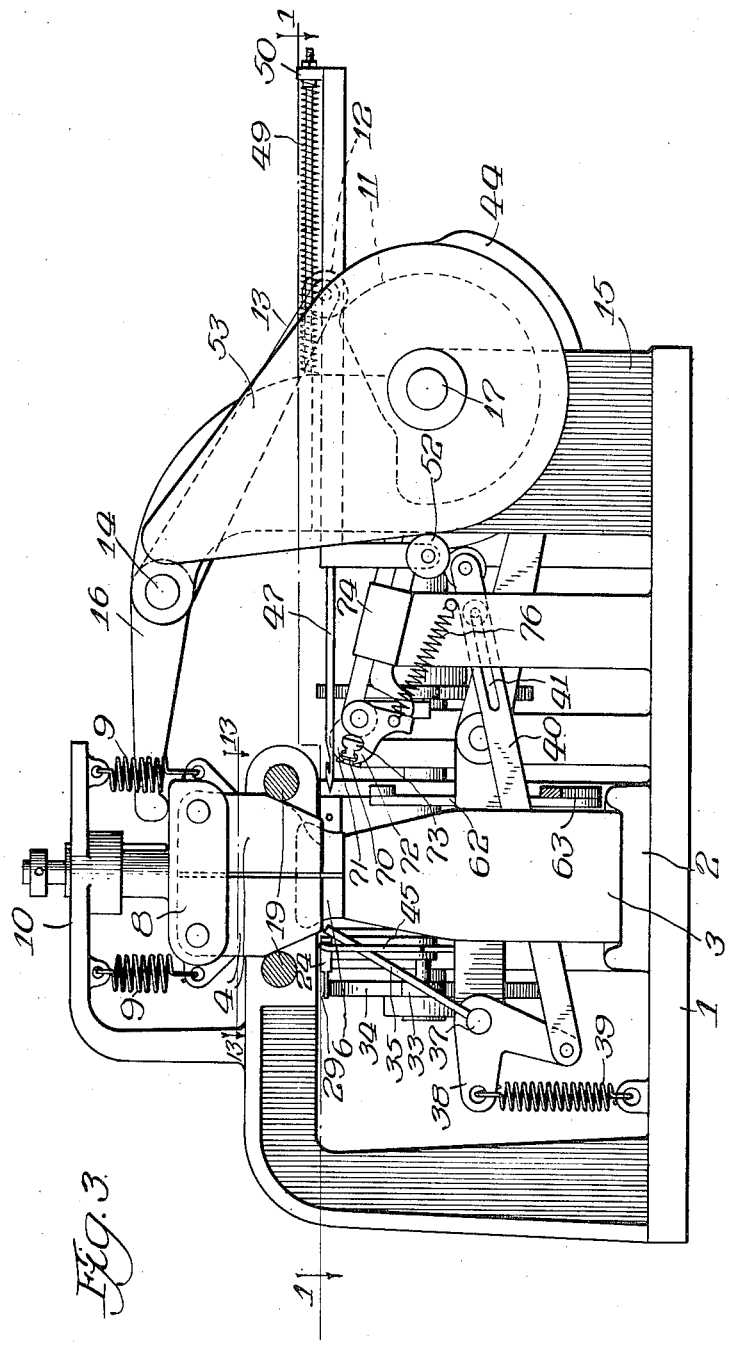

O. N. TEVANDER.
CLOSURE APPLYING MACHINE.
APPLICATION FILED JUNE 26, 1915.
1,219,791.
Patented Mar. 20, 1917.
7 SHEETS—SHEET 3.
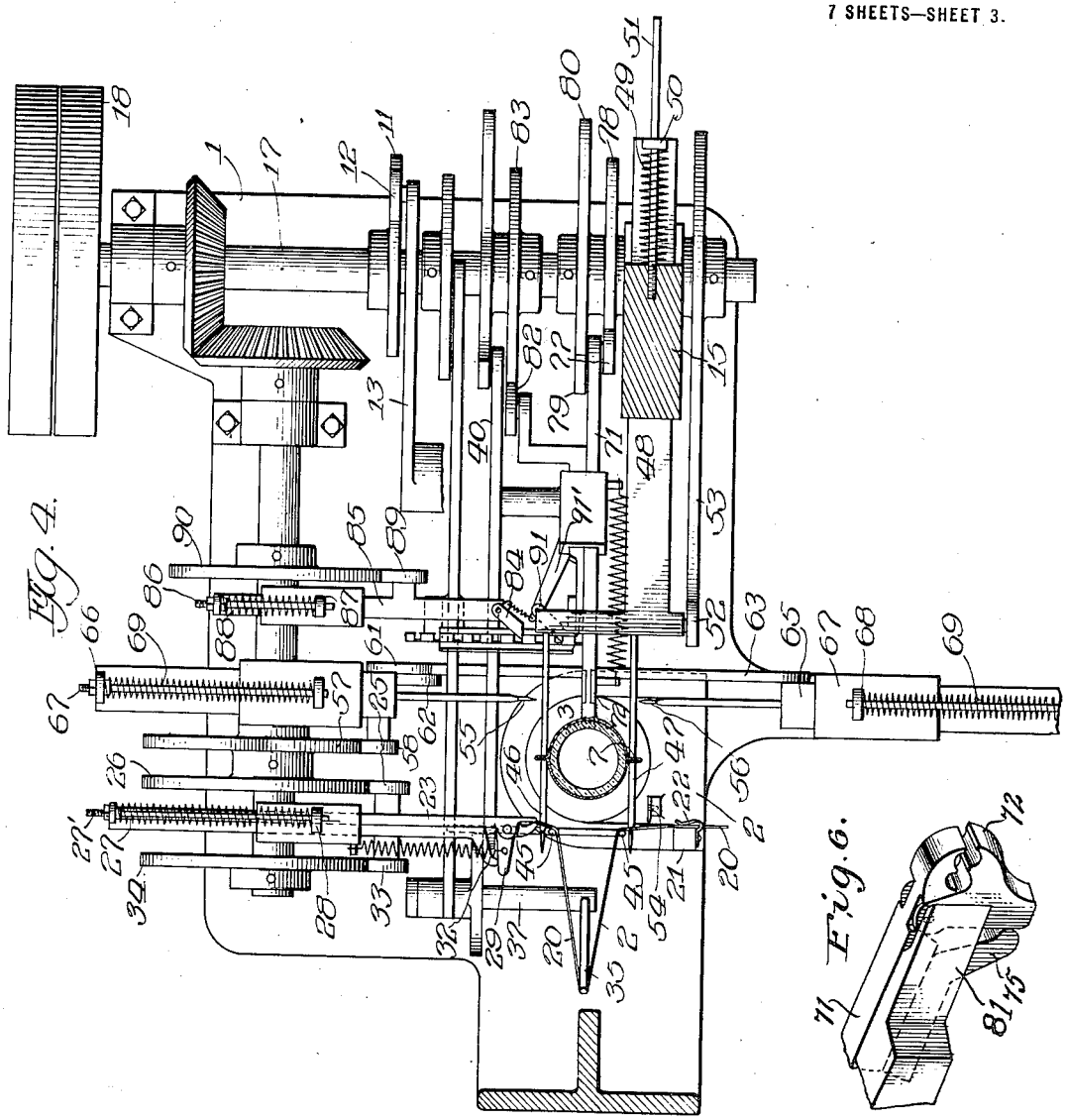
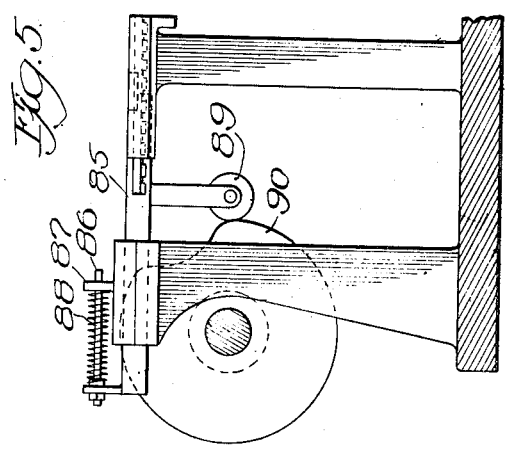
Inventor
Olof N. Tevander
By G. L. Cragg
Atty.

O. N. TEVANDER.
CLOSURE APPLYING MACHINE.
APPLICATION FILED JUNE 26, 1915.
1,219,791.
Patented Mar. 20, 1917.
7 SHEETS—SHEET 4.
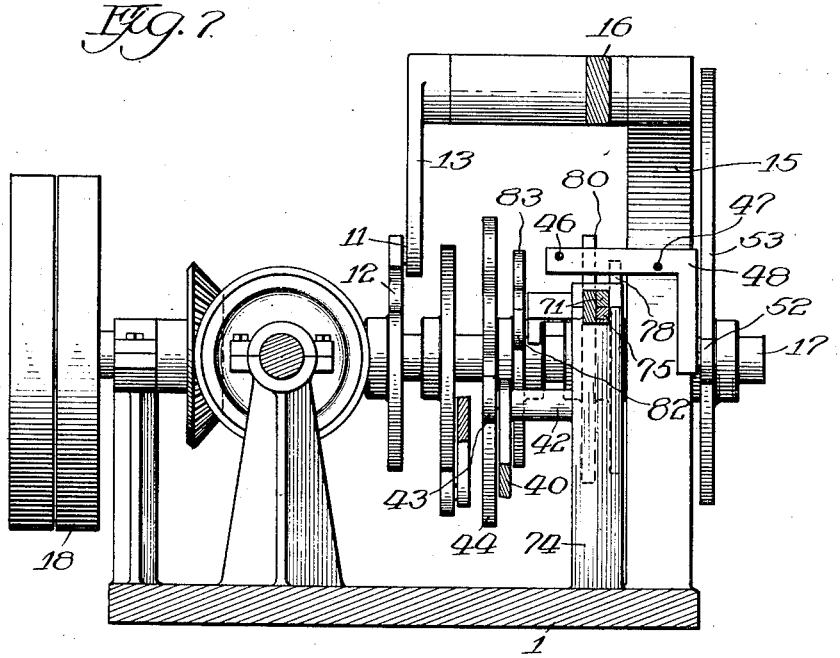
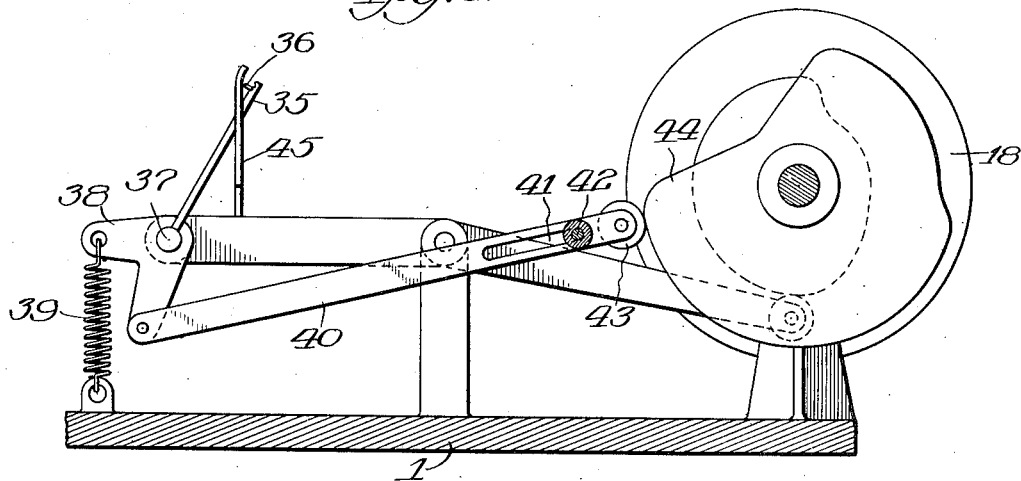
Inventor.
Olof N. Tevander.
By G. L. Gragg
Atty.

O. N. TEVANDER.
CLOSURE APPLYING MACHINE.
APPLICATION FILED JUNE 26, 1915.
1,219,791.
Patented Mar. 20, 1917.
7 SHEETS—SHEET 5.
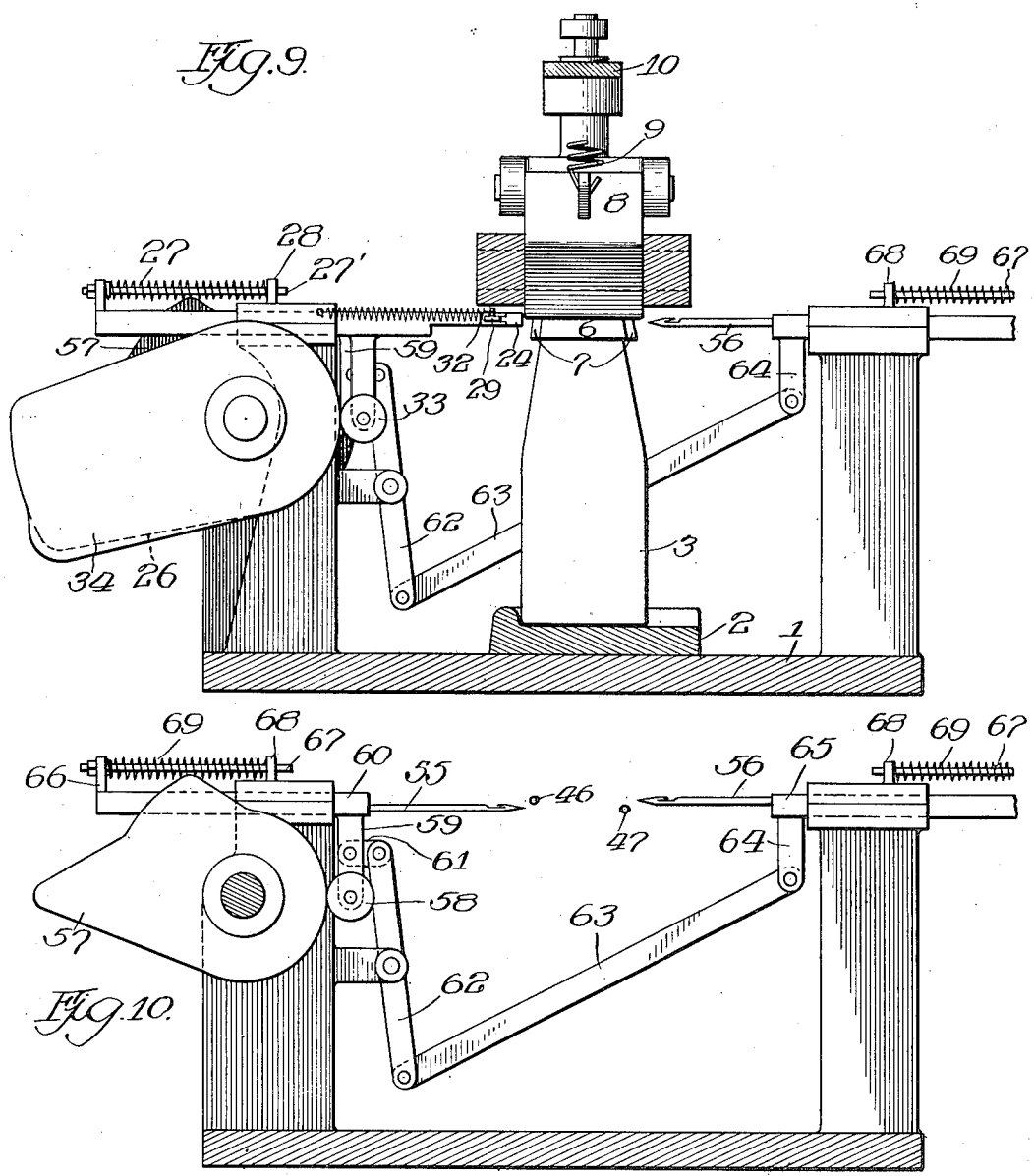
Inventor:
Olof N. Tevander
By G. L. Gragg Atty.

O. N. TEVANDER.
CLOSURE APPLYING MACHINE.
APPLICATION FILED JUNE 26, 1915.

1,219,791.

Patented Mar. 20, 1917.
7 SHEETS—SHEET 6.

Inventor:
Olof N. Tevander.
By G. L. Cragg
Atty.

O. N. TEVANDER.
CLOSURE APPLYING MACHINE.
APPLICATION FILED JUNE 26, 1915.
1,219,791.
Patented Mar. 20, 1917.
7 SHEETS—SHEET 7.
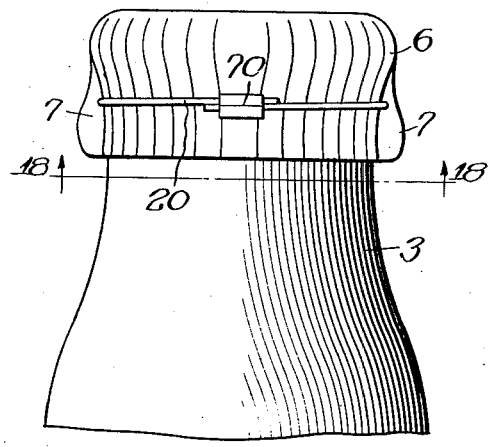
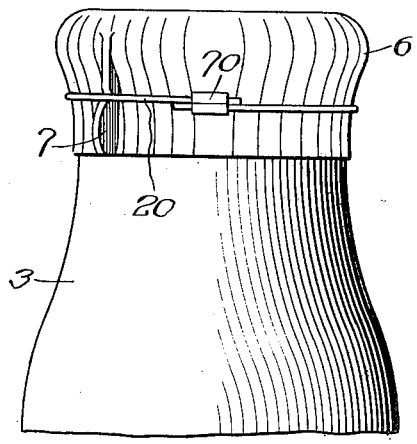
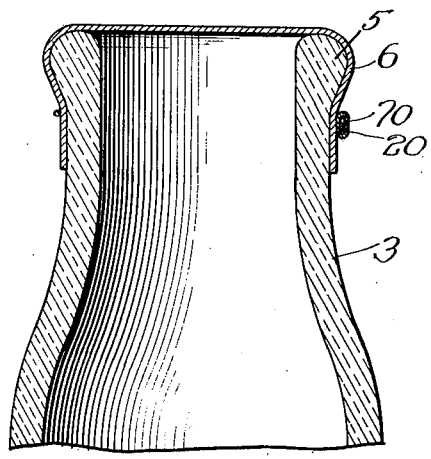
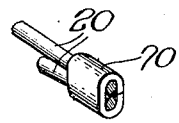
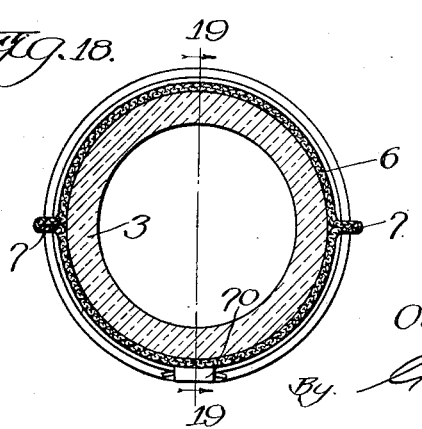
Inventor:
Olof N. Tevander.
By G. L. Cragg
Atty.

UNITED STATES PATENT OFFICE.

OLOF N. TEVANDER, OF CHICAGO, ILLINOIS.

CLOSURE-APPLYING MACHINE.

1,219,791.  Specification of Letters Patent.  Patented Mar. 20, 1917.

Application filed June 26, 1915. Serial No. 36,556.

*To all whom it may concern:*

Be it known that I, OLOF N. TEVANDER, citizen of the United States, residing at Chicago, in the county of Cook and State of Illinois, have invented a certain new and useful Improvement in Closure-Applying Machines, of which the following is a full, clear, concise, and exact description, reference being had to the accompanying drawings, forming a part of this specification.

My invention relates to machines for applying closures to containers and finds a very useful embodiment in a machine constructed to apply skirted caps to the beaded mouths of milk bottles, though the invention is not to be limited to this particular utility.

My invention has for its general object the provision of a machine for passing strings or bands about the skirts of closure caps. In the preferred embodiment of the invention the machine is supplied with mechanism whereby the ends of a string that is passed around the neck of a bottle are crossed and drawn in opposite directions whereafter suitable string clamping means may be applied to the string where the ends thereof cross, though the invention is not to be limited, in all of its embodiments, to an arrangement in which string ends are crossed.

The machine is desirably provided with mechanism for applying clips or other seals, or fasteners to ends of strings, the means for applying the clips being operated in proper sequence with respect to the means that dispose the string around the bottle neck. The machine of my invention desirably also includes mechanism for closely applying the skirts of bottle closures to the necks of bottles and which mechanism desirably also forms ears or projections in the skirt portions of the closures, which ears take part in holding the string in position with respect to the closures so that the string may not accidentally slip therefrom. In the embodiment of the invention herein shown the ears and string are brought into engagement preferably by causing the string to pass through the ears and the ends of the string are in some suitable manner brought into union to constitute the string a band. The string is preferably circular in cross section particularly when it is engaged with the ears by being passed therethrough.

Figure 13:
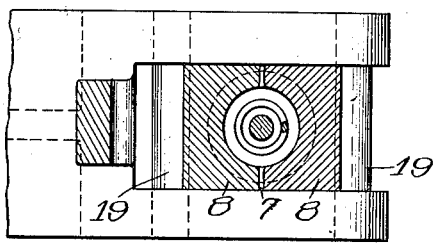
Figure 14:
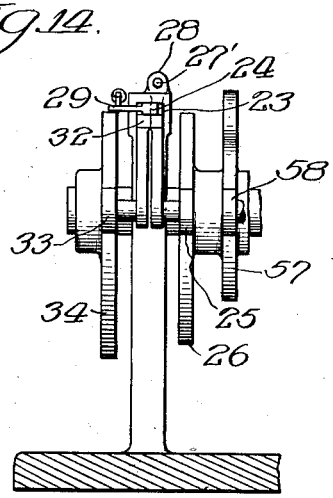
Figure 15:
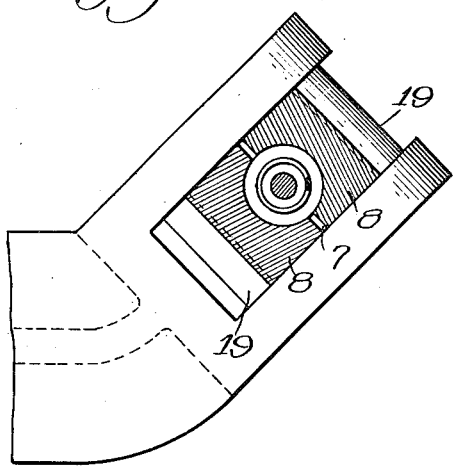
Figure 16:
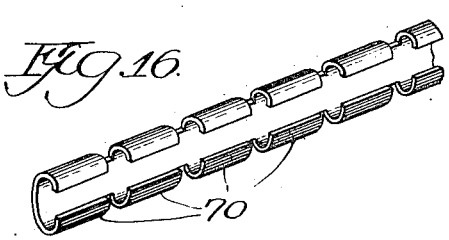

I will explain my invention more fully by reference to the accompanying drawings showing the preferred embodiment thereof, a modification of such embodiment, and the products of such embodiment and the modification, and in which drawings Figure 1 is a sectional plan view on line 1 1 of Fig. 3; Fig. 2 is a detail of the mechanism for applying the clips to the string disposed about containers, this view being taken on line 2 2 of Fig. 1; Fig. 3 is a side elevation, partially in section, of the machine; Fig. 4 is a view similar to Fig. 1 with parts in different positions; Fig. 5 illustrates mechanism employed in feeding clips to position with respect to the string to which they are to be applied, this figure being taken on line 5 5 of Fig. 1; Fig. 6 is a perspective view illustrating the crimping mechanism for applying the clips to the string and also the knife for cutting the clips, individually, from a strip thereof; Fig. 7 is a view on line 7 7 of Fig. 1; Fig. 8 is a sectional view on line 8 8 of Fig. 1, certain parts, however, being omitted for the sake of clearness; Fig. 9 is a sectional view on line 9 9 of Fig. 2, certain parts being omitted for the sake of clearness; Fig. 10 is a view on line 10 10 of Fig. 1; Fig. 11 is a perspective view of a string gripper for feeding the string to position to be operated upon; Fig. 12 is a view in sectional elevation of a part of the mechanism illustrated in Fig. 3; Fig. 13 is a view on line 13 13 of Fig. 3; Fig. 14 is a view illustrating mechanism for drawing the string to position within the machine; Fig. 15 shows a slight modification of a part of the machine of my invention; Fig. 16 is a perspective view of a strip of clips; Fig. 17 is a view in elevation of the product formed by the machine having the arrangement shown in Fig. 3; Fig. 18 is a view on line 18 18 of Fig. 17; Fig. 19 is a view on line 19, 19 of Fig. 18; Fig. 20 illustrates the product produced by the machine having the arrangement illustrated in Fig. 15; and Fig. 21 illustrates one form of the clip in the shape it has after being applied to the overlapping ends of a string.

Like parts are indicated by similar characters of reference throughout the different figures.

The base 1 of the machine supports a container seat 2 which is designed to center each container (such as a bottle 3) in axial alinement with the mechanism composed of jaws 4 and adapted to receive the mouth of the container as illustrated most clearly in Fig. 3. The machine, being shown as capable of operation upon a milk bottle 3, has its jaws 4 capable of receiving the outsetting bead 5 usually provided at the mouth of a bottle, these jaws being also adapted to move downwardly along the bottle in the process of gathering the portions of the skirt of the cap 6 (preferably made of paper) into outsetting folds, projections or ears 7. The jaws 4 are maintained in assembly by being pivotally mounted upon the head 8. The structure comprising jaws 4, and head 8, is supported by springs 9 that depend from a bracket 10 and whose lower ends are connected with ears projecting from the jaws 4 whereby the jaws will be spread apart unless they are forced together by some means acting in opposition to the springs. A cam 11 engages a cam roller 12 carried upon a cam lever 13 which is fixedly secured to a shaft 14 journaled in the standard 15 forming a part of the frame of the machine. Another cam lever 16 is also fixedly secured to the shaft 14 at one end and has its other end in engagement with the jaw head 8. The cam 11 is fixedly secured upon the main shaft 17 of the machine which is driven by the fixed pulley 18. This cam, at the proper time, causes the operation of the cam lever 16 to depress the jaws 4 against the force of the springs 9, the lower tapering portions of the jaws passing between rods 19 that are carried by the frame of the machine. When the jaws are thus depressed they are closed together and in being closed together they closely apply the skirt of the cap 6 to the neck of the bottle and form the outsetting projections or ears 7 in such skirted portion. After the jaws have held a cap to the mouth of a bottle to enable the assembly of the cap and bottle they are removed from the bottle to permit of the removal of the bottle and the application of a new cap to another bottle, there being some suitable means common to this cap holding mechanism and the mechanism for applying the string to the caps for operating these mechanisms in orderly sequence. When the jaws are disposed as illustrated in Fig. 3 the product illustrated in Figs. 17, 18 and 19 is produced. When the jaws are positioned as illustrated in Fig. 15 the product illustrated in Fig. 20 is produced, the ears 7 in the latter case being shifted 45° from the position of the ears 7 illustrated in Fig. 1.

Continuing the description of the invention which is being given more particularly with reference to Figs. 1 to 14, inclusive, the string 20 to be passed around the skirts of the bottle caps is fed into the machine between the post 21 and the spring clip 22 that presses the string against the post. By mechanism to be described, the string is severed in each operation and the end that is left hanging within the machine is gripped between fingers 23 and 24 that are thereafter rearwardly drawn to pull enough string within the machine for application to the next bottle. The finger 23 is rearwardly extended and carries a roller 25 that is maintained in engagement with a cam 26 by a spring 27. The forward end of the spring 27 engages the stationary abutment 28 while the rear end of the spring engages the rear end of the finger 24, the spring being under compression in order that it may effect the application of the roller 25 to the cam 26 by the distention of the spring. A rod 27' passes through the bore of the spring to position it, this rod being operable through the abutment 28. The finger 24 is pivotally secured upon the forward end of the finger 23 and is provided with a tail 29 that is connected by a pulling spring 30 with the stationary anchorage 31, the spring serving when free to act to maintain the gripping finger 24 sufficiently away from the finger 23 to permit of the entry between the fingers of the string 20. When the open fingers 23 and 24 have been advanced close to the post 21 by the operation of the cam 26, the dangling end of the string is received between the fingers whereafter the tail 29 is pushed upon by the pusher 32 to have the fingers grip the string. The pusher 32 carries a roller 33 that is operated upon by the cam 34 to operate the pusher. The cam roller 33 is maintained in engagement with the cam 34 by the aforesaid spring 30 that operates through the tail 29 for this purpose. While the fingers are in gripping engagement with the string they are moved rearwardly by the spring 27, as is also the pusher 32 while still pressing upon the tail 29, whereby the fingers are placed in the position illustrated in Fig. 4. While the fingers are still gripping the string, the string is engaged between the fingers and the post 21 by an oscillating prong 35 which carries a finger 36 to prevent the string from dropping to the base of the prong. A prong 35 is mounted upon a shaft 37 which is in fixed relation with the elbow of a bell crank 38. One end of the bell crank is coupled by a spring 39 with the frame of the machine, the other end of the bell crank being connected with a cam lever 40 having a slot 41 receiving a pin 42 whereby the cam lever is guided as it is moved by the bell crank. The lever 40 carries a cam roller 43 which is maintained in engagement with a cam 44 by the spring 39. After the fingers 23 and 24 have been placed in the position illustrated in Fig. 4, the prong 35 is moved in a counter clockwise direction to draw the string to the position illustrated in Fig. 4, the prong 35 pulling enough string between the clip 22 and the post 21 for holding a cap upon a bottle. The prong 35 desirably operates between the sides of a U-shaped frame 45 to maintain the portions of the string adjacent the fingers 23 and 24 and the clip 22 substantially in alinement with the long finger 23, these alined portions of the string thus being in position to be engaged by hooks 46, 47, that operate transversely of these portions of the string. Said hooks are carried upon a reciprocating support 48 which operates through a standard 15 having sliding fit therewith. This standard also constitutes an abutment engaged by one end of a spring 49, the other end of the spring being in pushing engagement with an abutment 50 carried at the outer end of the support 48. The abutment 15 carries a rod 51 passing through the bore of the spring and in sliding relation to the abutment 50, whereby the spring is positioned. The reciprocating support 48 carries a cam roller 52 that is maintained in engagement with a cam 53 by the distending action of the spring 49. The cam 53 operates through the cam roller 52 and coöperates with the spring 49 to effect the reciprocation of the support 48 whereby the hooks 46 and 47 are moved to bring the hooking portions of the hook structures 46, 47 slightly beyond the parts of the string that are without the U-shaped frame 45, these portions of the string being tightly caught by the hooks on the return motion of the latter. Just after the string has been tightly caught by the hooks 46, 47, the fingers 23 and 24 are released from their gripping engagement with the string and as the hooks continue in their reverse motion the stationary knife 54 (mounted on the main frame of the machine) becomes effective to cut the string, the severed portion of the string being sufficient in quantity to be passed about the cap that is applied to the bottle mouth. To permit the return movement of the hooks 46 and 47 without disengaging the string therefrom the prong 35 is restored to its initial position by being moved in a clockwise direction. When the jaws are positioned as illustrated in Fig. 3 the ears 7 are in the path of the hooks 46 so that these hooks, in their movement toward the string, pass through the ears, the hooks in their return movement drawing the string through said ears, said hooks then performing the function of needles, the hooks thus taking part in the production of the product illustrated in Figs. 17, 18 and 19. When the jaws are positioned as illustrated in Fig. 15 the ears 7 would be at an angle of forty-five degrees to the position thereof illustrated in Figs. 1 and 4 so that these ears would be out of the path of the string holders or hooks 46 and 47, the hooks then taking part in the production of the product illustrated in Fig. 20. With either arrangement the hooks draw the ends of the severed portion of the string so far to the right as to firmly engage the bight of the string with the skirt of the bottle cap, the hooks remaining in their right hand positions sufficiently long to enable the string holders or hooks 55 and 56 to perform their function. These latter hooks are provided with mechanism whereby they are reciprocated in opposite directions, the hooks 55 being moved to position to engage the part of the string that is drawn by the hook 47 while the hook 56 is moved to a position to engage the part of the string that is drawn by the hook 46. In order that the string holders or hooks 55, 56 may not interfere with each other they may be relatively positioned as illustrated in Fig. 10, and in order that each hook 55, 56 may be limited to engagement with but one part of the string the string holders or hooks 46 and 47 may be relatively positioned to hold the string as indicated in Fig. 10. The hooks 55 and 56 are simultaneously operated in reverse directions by the cam 57 that operates upon a cam roller 58 that has actuating relation with these hooks. The hook 55 is coöperatively related with the roller 58 by having this roller mounted upon a finger 59 depending from the stock 60 that carries the hook 55. The hook 56 is coöperatively related with the roller 58 by means of the links 61, 62 and 63, the latter of which being coupled with the depending finger 64 carried by the stock 65 that carries a hook 56. Each stock carries an abutment 66 at its outer end and to which abutment is secured a rod 67 in sliding relation to a stationary abutment 68. Each rod 67 is surrounded by a spring 69, these springs operating to maintain the cam roller 58 in engagement with the cam 57 and coöperating with said cam and cam roller to effect the simultaneous movement of the hooks 55 and 56 in opposite directions. When the inner ends of the hooks 55 and 56 are crossed they tightly engage the string and when the movements of these hooks are reversed the ends of the string are overlapped as indicated in Fig. 1, this being in accordance with the preferred embodiment of the invention. When these hooks move the string so that its ends overlap they draw the string sufficiently tight properly to apply the skirt of the cap to the bottle neck, these hooks 55 and 56 being in this holding relation to the string while some form of string clamp or clip is applied to the string where its ends cross. As I have practised my invention I have employed U-shaped clips 70, one for application to each bottle, the clip that is to be applied being held between the forward ends of the gripping fingers 71 and 72, the latter finger being pivoted upon the former. These gripping fingers are together bodily movable and are held a slight distance from the bottle, while the hooks 55 and 56 are being operated, to enable these hook to draw the ends of the string through the opening 73 that is afforded by the gripping fingers 71 and 72 and which is so positioned with respect to the opening that holds the clip 70 that the overlapping ends of the string will fall into the space within the clip when said hooks are separated to the utmost. When this result occurs the fingers 71 and 72 are bodily advanced until they engage the skirt of the cap whereafter the finger 72 is moved toward the finger 71 to crimp the clip into engagement with the crossed portions of the string. When the clip has been thus applied to the string the finger 72 is withdrawn from the finger 71 and both of these fingers are restored to the position illustrated in Fig. 3 whereupon the bottle may be removed by hand, carrying with it the ends of the string that are still engaged by the hooks 55 and 56.

The preferred mechanism for controlling the movements of the fingers 71 and 72 will now be described. The finger 71 is mounted to reciprocate within a stationary guide 74 within which guide a pusher 75 is also mounted to reciprocate, a spring 76 maintaining the tail of the finger 72 in engagement with the forward end of said pusher. The finger 71 carries a cam roller 77 which is operated upon by a cam 78 while the pusher 75 carries a cam roller 79 that is operated upon by the cam 80. These cam rollers and their cams are so related and interrelated that the finger 71 and pusher 75 will move together except when the finger 72 is to be moved toward the finger 71 and away from such finger, when the pusher 75 is correspondingly moved forwardly and thereafter rearwardly with respect to the finger 71. The spring 76 operates through the fingers and pusher to maintain the cam rollers 77 and 79 in engagement with their cams whereby the desired bodily movement of the fingers and the desired movement of the finger 72 with respect to the finger 71 are obtained. The clips 70 are desirably initially formed in strips in which form they are fed into the machine. Whenever a clip is inserted between the fingers 71 and 72 it is cut away from its strip as by means of a reciprocating knife 81 which carries a cam roller 82 that is timely operated by a cam 83 (Fig. 6).

The strip of clips (clearly shown in Fig. 16) is fed inwardly by a pawl 84 which is carried upon a reciprocating pawl carrier 85 whose outer end carries a rod 86. The forward end of the rod is in sliding engagement with the stationary abutment 87 and the rod is surrounded by a spring 88. A cam roller 89 is mounted upon the carrier 85 and is pressed into engagement with a cam 90 by the spring 88, the cam and the spring co-operating properly to move the feeding pawl 84. A trailing pawl 91 serves to position the strip of clips after each feeding operation and during the time the feeding pawl is being retracted. The pawl has a stationary pivot, being mounted upon a stationary bracket 91'.

The product of the machine having mechanism as illustrated in Fig. 3 is illustrated in Figs. 17, 18 and 19, while the product of the machine having the arrangement of Fig. 15 is illustrated in Fig. 20. In either case the string is passed around the skirt of the bottle cap and is preferably overlapped and has its overlapping ends clamped, the overlapping ends being drawn in opposite directions in order that they may be passed through the clips to the best advantage.

I preferably employ non-metallic string which is considerably thicker than coarse sewing thread, though I do not wish to be limited to the thickness of the string employed nor to the material of which it is made.

The products shown in Figs. 17, 18, 19 and 20 are claimed in my co-pending applications Serial No. 36,557, filed June 25, 1915 (Case B) and Serial No. 36,558, filed June 25, 1915 (Case C).

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. A machine for applying skirted caps to receptacles including mechanism for folding the skirted portion of a cap into ear formation; mechanism for passing a string through said ear formation; mechanism for applying a string to the skirted portion of a cap and overlapping the ends of and pulling upon the string; mechanism for coupling a fastening device with the overlapping ends of the string to hold the ends of the string in relation; and means common to the aforesaid mechanisms for operating the same in orderly sequence.

2. A machine for applying skirted caps to receptacles including mechanism for folding the skirted portion of a cap into ear formation; mechanism for passing a string through said ear formation; mechanism for pulling upon the string; mechanism for coupling a fastening device with the ends of the string to hold the ends of the string in relation; and means common to the aforesaid mechanisms for operating the same in orderly sequence.

3. A machine for applying skirted caps to receptacles including mechanism for folding the skirted portion of a cap into ear formation; mechanism for passing a string through said ear formation; mechanism for pulling upon the string to effect its tight engagement with the skirt of the cap; and means common to the aforesaid mechanisms for operating the same in orderly sequence.

4. A machine for applying skirted caps to receptacles including mechanism for folding the skirted portion of a cap into ear formation; mechanism for passing a band through said ear formation and effecting its tight engagement with the cap; and means common to the aforesaid mechanisms for operating the same in orderly sequence.

5. A machine for applying skirted caps to receptacles including mechanism for passing a string through the skirt of a cap; mechanism for overlapping the ends of and pulling upon the string; and mechanism for coupling a fastening device with the overlapping ends of the string to hold the ends of the string in relation.

6. A machine for applying skirted caps to receptacles including mechanism for passing a string through the skirt of a cap; mechanism for pulling upon the string; and mechanism for coupling a fastening device with the ends of the string to hold the ends of the string in relation.

7. A machine for applying skirted caps to receptacles including mechanism for passing a string through the skirt of a cap; and mechanism for pulling upon the string to effect its tight engagement with the skirt of the cap.

8. A machine for applying skirted caps to receptacles including a holder for a cap and mechanism for passing a band through the skirt of the cap.

9. A machine for applying skirted caps to receptacles including mechanism for folding the skirted portion of a cap into ear formation; mechanism for applying a string to the skirted portion of a cap and overlapping the ends of and pulling upon the string to engage the string with the skirted portion of the cap; mechanism for coupling a fastening device with the overlapping ends of the string to hold the ends of the string in relation; and means common to the aforesaid mechanisms for operating the same in orderly sequence.

10. A machine for applying skirted caps to receptacles including mechanism for folding the skirted portion of a cap into ear formation; mechanism for applying a string to the skirted portion of a cap and overlapping the ends of and pulling upon the string to engage the string with the skirted portion of the cap; mechanism for coupling a fastening device with the ends of the string to hold the ends of the string in relation; and means common to the aforesaid mechanisms for operating the same in orderly sequence.

11. A machine for applying skirted caps to receptacles including mechanism for folding the skirted portion of a cap into ear formation; mechanism for applying a string to the skirted portion of a cap and pulling upon the string to effect tight engagement thereof with the skirt of the cap; and means common to the aforesaid mechanisms for operating the same in orderly sequence.

12. A machine for applying skirted caps to receptacles including mechanism for closely applying the cap skirts to the mouth portions of the receptacles; mechanism for pulling upon a string to engage the string with the skirted portion of a cap; mechanism for coupling a fastening device with the overlapping ends of the string to hold the ends of the string in relation; and means common to the aforesaid mechanisms for operating the same in orderly sequence.

13. A machine for applying skirted caps to receptacles including mechanism for closely applying the cap skirts to the mouth portions of the receptacles; mechanism for pulling upon a string to engage the string with the skirted portion of a cap; mechanism for coupling a fastening device with the ends of the string to hold the ends of the string in relation; and means common to the aforesaid mechanisms for operating the same in orderly sequence.

14. A machine for applying skirted caps to receptacles including mechanism for closely applying the cap skirts to the mouth portions of the receptacles; mechanism for pulling upon a string to effect tight engagement thereof with the skirt of a cap; and means common to the aforesaid mechanisms for operating the same in orderly sequence.

15. A machine for applying skirted caps to receptacles including mechanism movable with respect to the receptacles from and toward the receptacles to permit of the application of skirted caps to the mouth portions of the receptacles and operating to hold the caps to such mouth portions; mechanism for applying string about the skirt of a cap; mechanism for fastening the ends of the string applied to a cap; and means common to the aforesaid mechanisms for operating the same in orderly sequence.

16. A machine for applying skirted caps to receptacles including mechanism movable with respect to the receptacles from and toward the receptacles to permit of the application of skirted caps to the mouth portions of the receptacles and operating to hold the caps to such mouth portions; mechanism for holding a string; mechanism for pulling upon the string to effect tight engagement thereof with the skirt of a cap; mechanism for coupling a fastening device with the ends of the string to hold the ends of the string in relation; and means common to the aforesaid mechanisms for operating the same in orderly sequence.

17. A machine for applying skirted caps to receptacles including mechanism movable with respect to the receptacles from and toward the receptacles to permit of the application of skirted caps to the mouth portions of the receptacles and operating to hold the caps to such mouth portions; mechanism for holding a string; mechanism for pulling upon the string to effect tight engagement thereof with the skirt of a cap; mechanism for coupling a fastening device with the overlapping ends of the string to hold the ends of the string in relation; and means common to the aforesaid mechanisms for operating the same in orderly sequence.

18. A machine for applying skirted caps to receptacles including mechanism movable with respect to the receptacles from and toward the receptacles to permit of the application of skirted caps to the mouth portions of the receptacles and operating to hold the caps to such mouth portions; mechanism for holding a string; mechanism for pulling upon the string to effect tight engagement thereof with the skirt of a cap; mechanism for fastening the ends of the string to each other; and means common to the aforesaid mechanisms for operating the same in orderly sequence.

19. A machine for applying skirted caps to receptacles including mechanism movable with respect to the receptacles from and toward the receptacles to permit of the application of skirted caps to the mouth portions of the receptacles and operating to hold the caps to such mouth portions; mechanism for holding a string; mechanism for pulling upon the string to effect tight engagement thereof with the skirt of a cap; mechanism for fastening the overlapping ends of the string to each other; and means common to the aforesaid mechanisms for operating the same in orderly sequence.

20. A machine for applying skirted caps to receptacles including mechanism for closely applying the cap skirts to the mouth portions of the receptacles; mechanism for holding a string; mechanism for pulling upon the string to effect tight engagement thereof with the skirt of a cap; mechanism for fastening the ends of the string to each other; and means common to the aforesaid mechanisms for operating the same in orderly sequence.

21. A machine for applying skirted caps to receptacles including mechanism for closely applying the cap skirts to the mouth portions of the receptacles; mechanism for holding a string; mechanism for pulling upon the string to effect tight engagement thereof with the skirt of a cap; mechanism for fastening the overlapping ends of the string to each other; and means common to the aforesaid mechanisms for operating the same in orderly sequence.

In witness whereof, I hereunto subscribe my name this twenty second day of June A. D., 1915.

OLOF N. TEVANDER.

Witnesses:
G. L. CRAGG,
E. L. WHITE.